United States Patent Office 2,963,253
Patented Dec. 6, 1960

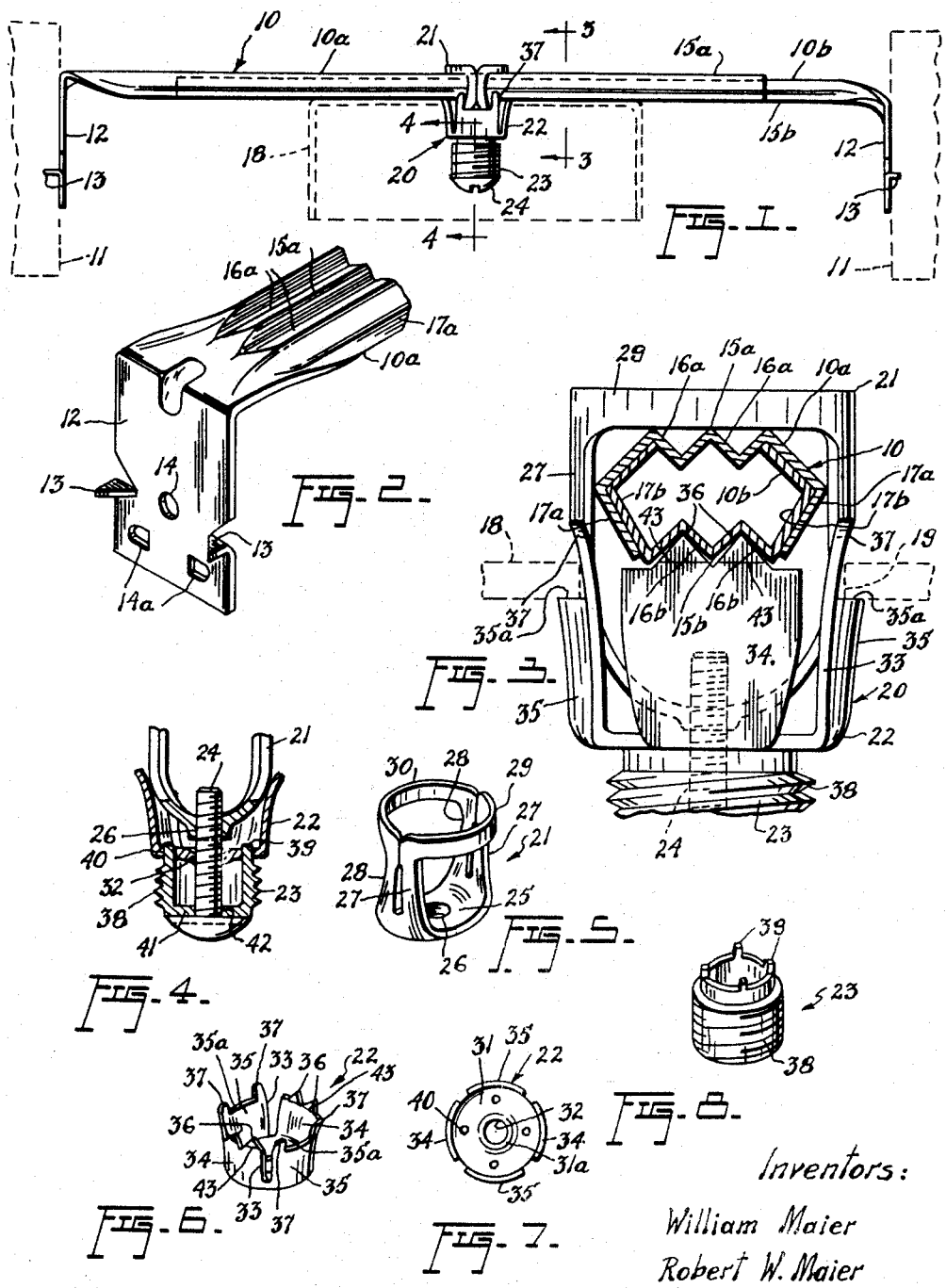

2,963,253

MOUNTING MEANS FOR ELECTRICAL OUTLET BOXES

William Maier, Stratford, Conn. (Ash St. at Bedford, Bridgeport, Conn.), and Robert W. Maier, 95 Gordon Road, Milford, Conn.

Filed May 2, 1958, Ser. No. 732,750

12 Claims. (Cl. 248—298)

This invention relates to new and useful improvements in mounting means for electrical outlet boxes, and the like, and the principal object of the invention is to facilitate highly expeditious and easy installation of such boxes between wall studs or ceiling beams.

The invention particularly concerns itself with mounting means of the general type shown, for example, in Patent No. 2,788,188, dated April 9, 1957, wherein a supporting bar consisting of two slidably telescoped sections is adapted to extend between and be fastened to two adjacent wall studs or ceiling beams, and wherein means are provided at a suitable point on the bar for fitting into an opening in an outlet box to secure the box thereto.

An important feature of the present invention resides in a corrugated arrangement of the supporting bar sections, whereby the same are rendered substantially rigid and better able to resist bending or other deflection.

Another important feature of the invention resides in an improved arrangement of the means for securing the box to the supporting bar, the same involving a clamp member which embraces the bar in engagement with one section thereof, a cap which coacts with the clamp member in engagement with the other section of the bar, and screw-threaded means cooperating with the clamp member and the cap in such manner that the same may be tightened against the respective sections of the bar to lock the sections against relative sliding and simultaneously lock the clamp member in a fixed position on the bar. The aforementioned cap, being resilient, is adapted to spring into an opening in the outlet box and frictionally engage the same, so that the box may be easily and quickly installed by pressingly snapping the box in place.

Another important feature of the invention resides in the provision of pointed prongs on the aforementioned cap, which are adapted to fit the corrugations of the bar sections and firmly grip the same, thus effectively guarding against any tendency of the box sliding or shifting longitudinally on the supporting bar.

Another important feature of the invention resides in the arrangement of the aforementioned screw-threaded means which take the form of a two-part unit including an externally threaded fastener member and a simple screw which extends therethrough into a threaded aperture in the aforementioned clamp member, the aforementioned cap being placed on the screw between the fastener member and the clamp member so that after the outlet box is snapped into place on the cap, the entire assembly may be securely locked by tightening the screw. The fastener member is formed separately from the cap and may be effectively employed for supporting various types of lighting fixtures.

Another important feature of the invention resides in the provision of means for preventing rotation of the threaded fastener member relative to the cap and, also, to prevent rotation of the cap relative to the clamp member, it therefore being unnecessary to hold the fastener member against rotation while a lighting fixture is being screwed thereon.

Some of the advantages of the invention lie in its simplicity of construction, in its durability, in its convenient use, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

Figure 1 is an elevational view of the invention;

Figure 2 is an enlarged fragmentary perspective view showing one end portion of the supporting bar;

Figure 3 is an enlarged sectional detail, taken substantially in the plane of the line 3—3 in Figure 1;

Figure 4 is an enlarged sectional detail, taken substantially in the plane of the line 4—4 in Figure 1;

Figure 5 is a perspective view of the clamp member;

Figure 6 is a perspective view of the cap;

Figure 7 is a bottom plan view of the cap; and

Figure 8 is a perspective view of the fastener member used in the invention.

Referring now to the accompanying drawings in detail, the reference numeral 10 generally designates a supporting bar which is adapted to extend between and be secured to two adjacent wall studs or ceiling beams 11, for which purpose the end portions of the bar are angulated to provide flat, rectangular ears or flanges 12, as shown. Pointed prongs 13 are struck out from opposite side edges of the flanges 12 so as to embed into the studs or beams 11 when the bar is installed, and in addition the flanges are formed with apertures 14 to receive nails or screws (not shown) for rigidly securing the same in place.

The bar 10 is composed of two slidably telescoped sections 10a and 10b, so that the length of the bar may be varied to suit various spacings of the studs or beams 11. As is best shown in Figure 3, the two sections 10a, 10b are similar in cross-section, although the section 10b is somewhat smaller so as to fit slidably in the section 10a. Each of the two sections is corrugated, whereby the outer face 15a of the section 10a is formed with a plurality of V-shaped, longitudinally extending grooves 16a, while the outer face 15b of the section 10b is similarly formed with a plurality of V-shaped, longitudinally extending grooves 16b. The grooves 16a are preferably two in number, as are the grooves 16b, although not necessarily so, since two or more grooves in each set may be provided.

The side edges 17a and 17b of the respective sections 10a, 10b are V-shaped in cross-section with the apex of the V being directed outwardly, it being noted that this particular corrugated arrangement of the bar sections lends substantial rigidity thereto and enables the same to effectively resist bending and other deflection.

The outlet box 18 may be secured to the bar 10 at any desired point along the length of the bar by mounting means designated generally by the numeral 20, these mounting means being adapted to cooperate with one of the usual openings 19 with which the box is formed. The means 20 comprise a clamp member 21 which embraces the bar 10, a coacting cap 22, a fastener member 23 and a screw 24, all to be presently described.

As is best shown in Figure 5, the clamp member 21 is formed integrally from a single blank of material and includes a base portion 25 provided with a screw-threaded aperture 26 to receive the screw 24; pairs of connecting portions 27, 28 which extend from the base portion 25; and a pair of complemental ring portions or sections 29, 30. The portions 27, 28 are disposed at diametrically opposite sides of the base portion 25 so that they may receive the bar 10 therebetween, and the portions 29, 30 bridge together the portions 27, 28 in the respective pairs, as shown. When the member 21 is applied to the bar 10, it embracingly straddles the bar, with the ring portions 29, 30 engaging the outer face 15a of the bar section 10a.

The cap 22 is generally cup shaped and includes a bottom 31 formed with an aperture 32 through which the screw 24 may freely pass. The lateral wall of the cap is provided with a set of open slots 33 which separate the same into pairs of diametrically opposed wall members 34, 35. The wall members 34 are provided with sets of pointed prongs 36 which are adapted to fit in the grooves 16b in the outer face 15b of the bar section 10b. The wall members 34, 35 are flared outwardly somewhat and are resilient in the sense that, as facilitated by the provision of the slots 33, they may flex radially inwardly and outwardly so that when the device is placed in use, the box 18 may be pressed into place over the cap 22, the edge of the box opening 19 first presses the wall members 35 inwardly until the box comes in contact with the face 15b of the bar section 10b, whereupon the edges 35a of the wall members 35 clear the edge of the opening 19 and spring out with a snap action against the inner surface of the box at the edge of the opening 19 to retain the box in place. At that time, the wall members 34 as well as the portions 27, 28 of the clamp member 21 frictionally engage the edge of the box opening 19, it being noted that the cap 22 receives therein the base portion 25 of the member 21, with the wall members 35 straddling the portions 27, 28.

Projecting detents 37 are provided on the wall members 35 at the opposite sides of the portions 27, 28 whereby to prevent the cap 22 from turning relative to the member 21. The detents 37 are sufficiently long that they also straddle the side edges 17a of the bar section 10a and thereby prevent rotation of the cap 22 relative to the bar.

The bottom 31 of the cap 22 is preferably formed with a raised portion 31a surrounding the aperture 32 to facilitate insertion of the screw 24, and the fastener member 23 is positioned on the screw in abutment with the cap. The member 23 is provided with external screw threads 38 whereby a suitable lighting fixture may be connected thereto, and to prevent the member 23 from rotating while the fixture is being installed, the member is equipped with a set of prong-like detents 39 which are received in a set of apertures 40 formed in the bottom 31 of the cap. The member 23 may be of cylindrical shape with a closed end wall 41 to abut the head of the screw 24, the wall being provided with an aperture 42 to freely receive the shank of the screw, as is best shown in Figure 4.

When the invention is placed in use, the clamp member 21 is first positioned on the bar 10 which is achieved by separating the bar sections 10a, 10b and subsequently slidably telescoping the same after the clamp member is in place. The bar is then adjusted longitudinally to the required span between the studs or beams 11 and is secured thereto by the prongs 13 and suitable fasteners such as nails or screws inserted in the apertures 14. Alternatively, suitable staples may be inserted in pairs of apertures 14a with which the ears 12 are also formed.

The fastener member 23 and the cap 22 are then assembled to the clamp member 21 by the screw 24 and as the screw is tightened, the portions 27, 28 of the member 21 will be drawn into a cam-like engagement with the wall members 35 of the cap 22, which will force the detents 37 into a frictional locking engagement with the edge of the box opening 19 when the box is subsequently installed in place. Moreover, the portions 29, 30 of the member 21 will clampingly engage the outer face 15a of the bar section 10a while the prongs 36 of the cap 22 will grip in the grooves 16b in the face 15b of the bar section 10b. As shown in Figures 3 and 6, the prongs 36 are preferably scored either or both at the inside and/or outside thereof as indicated at 43, so that when the screw 24 is tightened, the prongs will fold under and allow more pressure to be applied to the device. The folding under of the prongs will compensate for any variation in the thickness of the material of the box to be installed, since it permits the device to contact the bottom of the box regardless of its thickness.

After tightening of the screw 24 the bar sections 10a, 10b will be locked against relative sliding and at the same time the member 21 will be firmly locked in a predetermined position of the bar. The box 18 may then be readily installed by simply snapping the same into place over the cap 22, this being all that is necessary to retain the box in place. As is best shown in Figure 3, the edges of the wall members 34 which are equipped with the prongs 36 are relieved sufficiently from the face 15b of the bar section 10b that clearance exists in the grooves 16 to permit only the pointed extremities of the prongs 36 to engage the bar section, to fold themselves under as aforesaid, and grippingly embed themselves therein.

During installation of the cap 22 on the clamp member 21 the screw 24 is, of course, loose and ordinarily this looseness would permit undesirable rotation of the cap relative to the clamp member inasmuch as the looseness of the screw would not necessarily afford a disposition of the detents 37 at the sides of the portions 27, 28 as they are when the cap is properly seated. However, such undesired turning of the cap is effectively prevented by the disposition of the detents 37 at opposite sides of the bar 10, as already mentioned.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A mounting means for an electrical outlet box having an opening therein, a support bar for a box comprising a pair of slidably telescoped sections, each of said sections being of a corrugated configuration and having an outer face provided with a plurality of V-shaped grooves extending longitudinally therein, a clamp member embracing said sections and slidable longitudinally thereon, a resilient cap, a plurality of pointed V-shaped prongs provided on said cap and seated in said grooves of said sections, and screw-threaded means attaching said cap to said clamp member whereby the clamp member and the cap may coact to simultaneously lock said sections against relative sliding and to retain the clamp member in a fixed position thereon, said cap being of such size as to spring into the opening of a box and frictionally engage the same when the box is pressed in place over the cap.

2. A mounting means for an electrical outlet box having an opening therein, a support bar for a box, said bar being of a corrugated configuration and having a face provided with a plurality of V-shaped grooves extending longitudinally therein, a clamp member embracing said bar and slidable longitudinally thereon, a resilient cap, a plurality of pointed V-shaped prongs provided on said cap and seated in said grooves of said bar, and screw-threaded means attaching said cap to said clamp member whereby the clamp member and the cap may coact to lock the clamp member in a fixed position on said bar, said cap being of such size as to spring into the opening of a box and frictionally engage the same when the box is pressed in place over the cap.

3. A mounting means for an electrical outlet box having an opening therein, a support bar for a box comprising a pair of slidably telescoped sections, each of said sections being of a corrugated configuration and having an outer face provided with a plurality of V-shaped grooves extending longitudinally therein, a clamp member embracing said bar in engagement with one of said sections and slidable longitudinally thereon, a resilient cap coacting with said clamp member, a plurality of pointed V-shaped prongs provided on said cap and seated in said grooves of the other section of said bar, and screw-threaded means attaching said cap to said clamp member whereby to urge the same against the respective sections of the bar to simultaneously lock the sections against relative sliding movement and retain the clamp member in a fixed position thereon, said cap being of such size as to spring into the opening of a box and frictionally engage the same when the box is pressed in place over the cap.

4. A mounting means as defined in claim 3 wherein said screw-threaded means comprise an externally threaded fastener member abutting said cap, and a screw-threaded element extending through said fastener member and through said cap into a threaded aperture formed in said clamp member.

5. Mounting means for electrical outlet boxes, comprising a support bar consisting of a pair of slidably telescoped sections, each of said sections being of a corrugated configuration and having an outer face provided with a plurality of V-shaped grooves extending longitudinally therein, a clamp member embracing said bar in engagement with one of said sections and slidable longitudinally thereon, a resilient cap coacting with said clamp member, a plurality of pointed V-shaped prongs provided on said cap and seated in said grooves of the other section of the bar, and screw-threaded means attaching said cap to said clamp member whereby to urge the same against the respective sections of the bar to simultaneously lock the sections against relative sliding movement and retain the clamp member in a fixed position thereon, said cap being of such size as to spring into an opening of an outlet box and frictionally engage the same when the box is pressed in place over the cap.

6. The device as defined in claim 5 wherein said screw-threaded means comprise an externally threaded fastener member abutting said cap, and a screw-threaded element extending through said fastener member and through said cap into a threaded aperture formed in said clamp member.

7. The device as defined in claim 5 wherein said screw-threaded means comprise an externally threaded fastener member abutting said cap, a screw-threaded element extending through said fastener member and through said cap into a threaded aperture formed in said clamp member, and means for preventing rotation of said fastener member on said element relative to said cap.

8. The device as defined in claim 5 wherein said clamp member is formed integrally from a single blank of material and comprises a base portion formed with a threaded aperture receiving said screw-threaded means therein, pairs of connecting portions extending from diametrically opposite sides of said base portion and receiving said bar therebetween, and a pair of complemental ring sections bridging together said connecting portions in the respective pairs, said ring sections engaging an adjacent section of said bar.

9. The device as defined in claim 5 together with means for locking said cap against rotation relative to said clamp member.

10. Mounting means for electrical outlet boxes, comprising a support bar, said bar being of a corrugated configuration and having a face provided with a plurality of V-shaped grooves extending longitudinally therein, a clamp member embracing said bar and engaging a relatively opposite face thereof, said clamp member being slidable longitudinally on said bar, a resilient cap coacting with said clamp member, a plurality of pointed V-shaped prongs provided on said cap and seated in said grooves in the bar, an externally threaded fastener member abutting said cap, and a screw-threaded element extending through said fastener member and through said cap into a threaded aperture formed in said clamp member, whereby to urge the clamp member and the cap against opposite faces of said bar and lock the clamp member in a fixed position thereon.

11. The device as defined in claim 10 together with means for preventing rotation of said fastener member on said element relative to said cap.

12. The device as defined in claim 10 together with score lines provided on said cap at the base of said prongs, said prongs being bendable along said score lines and deformable in said grooves upon tightening of said screw-threaded element.

References Cited in the file of this patent
UNITED STATES PATENTS

| | | |
|---|---|---|
| 2,246,189 | Rugg | June 17, 1941 |
| 2,260,829 | Carlson | Oct. 28, 1941 |
| 2,729,414 | Clark | Jan. 3, 1956 |
| 2,732,162 | McKinley | Jan. 24, 1956 |
| 2,788,188 | Smith | Apr. 9, 1957 |
| 2,824,167 | Bauer | Feb. 18, 1958 |